(12) United States Patent
Allenberg et al.

(10) Patent No.: US 7,712,381 B2
(45) Date of Patent: May 11, 2010

(54) ANTENNA DEVICE FOR INJECTING OR EXTRACTING MICROWAVES INTO/FROM TUBULAR HOLLOW BODIES, AND DEVICE FOR MEASURING MASS FLOW BY USING ANTENNA DEVICES OF THIS TYPE

(75) Inventors: Bernd Allenberg, Muehltal (DE); Andreas Penirschke, Herborn (DE); Rolf Jakoby, Rosbach (DE)

(73) Assignee: Schenck Process GmbH, Darmstadt (DE)

( * ) Notice: Subject to any disclaimer, the term of this patent is extended or adjusted under 35 U.S.C. 154(b) by 129 days.

(21) Appl. No.: 11/791,630

(22) PCT Filed: Nov. 25, 2005

(86) PCT No.: PCT/EP2005/012603

§ 371 (c)(1),
(2), (4) Date: May 24, 2007

(87) PCT Pub. No.: WO2006/056455

PCT Pub. Date: Jun. 1, 2006

(65) Prior Publication Data

US 2008/0087099 A1    Apr. 17, 2008

(30) Foreign Application Priority Data

Nov. 25, 2004   (DE) .................... 10 2004 057 087

(51) Int. Cl.
*G01P 5/08* (2006.01)

(52) U.S. Cl. .................... 73/861.08; 73/861.12

(58) Field of Classification Search ............ 73/861.08, 73/861.12; 343/700 MS, 705
See application file for complete search history.

(56) References Cited

U.S. PATENT DOCUMENTS

| | | | | |
|---|---|---|---|---|
| 4,631,969 A | * | 12/1986 | Schmoock | 73/861.12 |
| 4,764,718 A | * | 8/1988 | Revus et al. | 324/640 |
| 5,750,902 A | * | 5/1998 | Schwiderski | 73/861.12 |
| 5,793,216 A | * | 8/1998 | Constant | 324/639 |
| 6,470,734 B1 | * | 10/2002 | Jakkula et al. | 73/53.03 |
| 7,102,133 B2 | | 9/2006 | Happel | |
| 2003/0201937 A1 | | 10/2003 | Lee | |
| 2004/0011140 A1 | * | 1/2004 | Coulthard et al. | 73/861.04 |

FOREIGN PATENT DOCUMENTS

| | | |
|---|---|---|
| DE | 94 12 243 | 9/1994 |
| DE | 44 06 046 | 8/1995 |
| DE | 198 00 306 | 7/1999 |
| DE | 101 37 009 | 4/2003 |
| EP | 0 703 447 | 3/1996 |
| EP | 0 717 269 | 6/1996 |
| JP | 59-019814 | 2/1984 |

* cited by examiner

*Primary Examiner*—Michael C Wimer
*Assistant Examiner*—Kyana R Robinson
(74) *Attorney, Agent, or Firm*—W. F. Fasse; W. G. Fasse

(57) ABSTRACT

An antenna arrangement for coupling high frequency electromagnetic waves into or out of a pipe-shaped hollow body includes two patch antenna elements that are located opposite one another and integrated in the pipe inner wall (5) of the hollow body (1), and have curved surfaces fitted to the curved longitudinal pipe inner wall of the hollow body (1). An apparatus for mass flow measurement includes at least two of such antenna arrangements axially spaced apart from one another in a conveyor pipe section.

24 Claims, 2 Drawing Sheets

ANTENNA DEVICE FOR INJECTING OR EXTRACTING MICROWAVES INTO/FROM TUBULAR HOLLOW BODIES, AND DEVICE FOR MEASURING MASS FLOW BY USING ANTENNA DEVICES OF THIS TYPE

FIELD OF THE INVENTION

The invention relates to an antenna arrangement for coupling microwaves into or out of a pipe-shaped hollow body, and to an apparatus for mass flow measurement in pipe-shaped hollow bodies by means of such antenna arrangements.

BACKGROUND INFORMATION

For the transmission of high frequency energy through the atmosphere or in hollow bodies, antenna arrangements are known, which radiate electromagnetic high frequency waves in these media, whereby the high frequency waves also can again be received via such antenna arrangements. Such antenna arrangements serve for the conversion of electrical signals into electromagnetic waves or electromagnetic waves into electrical signals. These arrangements are used for information transmission or for evaluating the transmission space. Especially in the measurement technology, often spacing distances, speeds or the distribution of solid bodies or particles in dielectric media are detected through use of high frequency waves in the microwave frequency range, and the magnitude or quantity thereof are evaluated through special evaluating or measuring apparatuses. For that purpose, the solid bodies or particles to be measured must come into the radiation emission area, or the radiation emission area must be directed onto the measurement objects, whereby the radiation emission can be achieved by variously embodied antenna arrangements.

A method and an apparatus for the measurement of the volume proportion of a multi-phase flow in a pipeline by means of microwave radiation is known from the EP 0 703 447 B1. For that purpose, a row of microwave antennas are arranged on the circumference of the pipeline being flowed through, whereby the microwave antennas feed microwave energy into the pipeline, whereby the coupled-in microwave energy is simultaneously detected by a different microwave antenna. By integrating the coupled-out microwave energy, the particle volume proportion present in the flow is determined in the spread-out or propagated microwave field. For that purpose, twelve dipole antenna pairs are arranged symmetrically on the circumference of the pipe, whereby the dipole antenna pairs radiate the microwave energy orthogonally to the flow direction and perpendicularly to the radial direction into the pipeline being flowed-through. The dipole antenna pairs involve cross-wise arranged dipoles, which consist of a plurality of small pipe pieces welded together with one another, and which are arranged on the circumference of the pipe inner wall. Such antennas are very complicated or costly in the production and can impair a through-flowing multi-phase particle flow at least with smaller pipe cross-sections, so that such antennas are preferably utilized for larger pipeline diameters.

A further microwave measuring method for mass flow determination of a particle flow or stream in a round pipe-shaped hollow body is known from the DE 101 37 009 C1. For that purpose, an opening is provided in the pipe wall, into which opening a horn antenna is set-in or inserted, by which horn antenna microwave energy produced by a Gunn diode is coupled into the pipe interior via a hollow conductor or waveguide. These electromagnetic waves radiated into the flow channel are reflected by the particle stream and are simultaneously again received by the horn antenna and are supplied to a Schottky diode as a reflection receiver. Thereby, the measure or degree of reflection represents a function of the electromagnetic radiation reflected by the solid material proportion or component over the cross-section of the flow channel. The differential quotient according to time is formed from the time progression or course of the measurement signal, whereby this differential quotient represents a measure for the concentration of the particle distribution in the measurement area. Through a subsequent bridge rectifier circuit, the integral is mathematically formed from the derived measurement signal, whereby the magnitude value of the integral is to represent a measure for the mass through-flow in the flow channel. In that regard, the horn antenna radiates the microwave energy into the flow channel essentially only over the cross-section, so that only a small measurement range or area can be utilized in the axial direction, and only a limited measurement accuracy should be achievable therewith.

A further microwave measuring arrangement is known from the DE 44 06 046 C2, with which measuring arrangement a powder mass flow in a pneumatic conveying line is quantitatively determinable. For that purpose, a microwave resonator is arranged or mounted on the outer casing of the conveyor line, whereby this microwave resonator essentially consists of a resonance space or chamber, in which a high frequency antenna produces a microwave field. Since the conveyor line is apparently embodied as a plastic hose, the electromagnetic microwaves penetrate through the conveyor line wall and are damped in their amplitude and changed in their resonance frequency by the through-flowing mass particles. Thereby, the powder mass per unit volume is measured in the pipe interior. Simultaneously, still additionally, the speed of the through-flowing particle stream is detected by means of two spaced apart electrodes, and the conveying magnitude or the through-flow quantity is calculated by means of the measured volume mass. Such a coupling-in of microwaves, however, has a poor efficiency or degree of effectiveness, because the majority of the produced microwave radiation is radiated away outside of the pipe and therefore can no longer be coupled-out for the measurement signal evaluation. Such a measuring arrangement therefore requires a relatively high microwave energy for radiating-in, or a high measurement technology evaluation effort or expense, in order to achieve a sufficient measuring accuracy.

A further microwave measuring method and a corresponding apparatus is known from the EP 0 717 269 A2, in which the mass throughput is detectable in a pipe-shaped pneumatic conveyor line. For that purpose, for feeding-in microwaves, three coupling openings are provided on the circumference of the pipe wall, and the microwave energy is delivered to the coupling openings by means of hollow conductors or waveguides, coaxial conductors or strip line conductors, and can be coupled into the pipe-shaped conveyor line. At an axial spacing distance from the in-coupling openings, further similar out-coupling openings are mounted or arranged in the pipe wall, through which the coupled-in microwave energy is again coupled out. In order that also a multi-phased fluctuating particle flow is sufficiently accurately detectable over the entire conveyor line cross-section, three in-coupling and three out-coupling openings are provided, into which the microwave energy is coupled-in and coupled-out in a pulsed fashion one after another. For the determination of the conveying magnitude, the out-coupled microwaves are compared with a reference value without conveyor line loading, both after the damping thereof in the amplitude, as well as after the phase shifting thereof. In that regard, the deviation from this reference value is proportional to the loading density on the measurement section or path. Through a cross-correlation, the conveying speed is additionally determined, from which the conveying magnitude or the mass flow can be calculated by multiplication with the loading density on the measurement section.

The coupling openings or slots utilized in that regard feed the microwave energy basically uniformly into both axial pipe directions, so that maximally 50% of the supplied microwave energy is available for evaluation in the measurement direction. For the exact evaluation of the coupled-in microwave energy over a necessary measuring section length within the conveyor pipe, therefore relatively high microwave energies are necessary, which can also lead to reflections due to the undirected spreading-out or propagation, whereby these reflections interfere with the measuring signal and are only reducible through suitable time windows and thus only in a pulsed operation. For this purpose, however, a relatively high expense or effort is necessary for the coupling-in and coupling-out of the microwave energy and for the evaluation thereof.

A special antenna arrangement for the in-coupling of microwaves into a pipe-shaped hollow body, for the measurement of a volume proportion located therein, is known from the DE 94 12 243 U1, which makes possible a microwave radiation in one axial direction of the hollow body. This antenna arrangement is utilized for the filling level measurement in a pipe-shaped container, and includes a rod radiator antenna, which radiates out the microwave energy in one axial longitudinal direction of the pipe-shaped hollow body, of which the radiated energy in this direction comprises a high efficiency or degree of effectiveness. This rod radiator antenna would, however, be located in the conveyor stream in a pipe-shaped hollow body being flowed through, and here would not only interfere with the particle stream, but also be subjected to wear depending on the abrasion.

A further antenna arrangement for filling level measurement in a pipe-shaped hollow body is known from the DE 198 00 306 A1, which provides an axially directed microwave in-coupling by means of a so-called flat patch element. For that purpose, a planar radiator element is provided on the front end or end face of a hollow conductor or waveguide, whereby the planar radiator element essentially consists of a flat electrically conductive metal disk, which is applied on a plate-shaped dielectric substrate. An electrically conductive layer or a part of the metallic waveguide rear wall is applied above the dielectric substrate, and the high frequency energy is coupled-in therethrough. For that purpose, a coaxial connector is provided outside of the pipe wall, whereby the inner conductor is connected with the patch element and the outer conductor is connected with the metallic pipe wall or the electrically conductive layer. In that regard, the supplied microwave energy is coupled only in one axial direction into the pipe-shaped waveguide through the flat patch element, so that with this antenna arrangement nearly the entire microwave energy is radiated out in the measuring direction, whereby a high efficiency would be achievable with a targeted out-coupling over a measuring section or path. If one would, however, utilize such a patch element in a through-flowable conveyor pipe, it would have to be arranged transversely in the conveyor stream and would similarly considerably impair the particle stream and would be subjected to wear by to the particle stream.

SUMMARY OF THE INVENTION

Therefore, the object underlies the invention, to provide an antenna arrangement for the in-coupling or out-coupling of electromagnetic high frequency energy in a through-flowable pipe-shaped hollow body, which makes possible an in-coupling with a high efficiency and which impairs or alters the interior area of the hollow body as little as possible. Simultaneously, an apparatus for the detection of the mass flow in such a pipe-shaped hollow body is to be provided with this antenna arrangement.

The above objects have been achieved according to the invention in an antenna arrangement for coupling high frequency electromagnetic waves into or out of a pipe-shaped hollow body, and an apparatus for mass flow measurement including at least two of the inventive antenna arrangements. The inventive antenna apparatus comprises a hollow pipe-shaped body and at least one antenna arrangement arranged and adapted to couple high frequency electromagnetic energy into or out of a hollow pipe interior of the pipe-shaped body. The pipe-shaped body comprises a pipe wall that extends longitudinally along a pipe axis, and that is radially outwardly bounded by a pipe wall outer surface, and that is radially inwardly bounded by a curved pipe wall inner surface. The curved pipe wall inner surface curves around the pipe axis and circumferentially surrounds the hollow pipe interior of the pipe-shaped body. Each antenna arrangement respectively comprises first and second patch antenna elements that are both together arranged and adapted to couple the high frequency electromagnetic energy either into the hollow pipe interior or out of the hollow pipe interior. The first and second patch antenna elements of the respective antenna arrangement are arranged diametrically opposite one another in the pipe wall, with each one of the patch antenna elements received radially between the pipe wall inner surface and the pipe wall outer surface. Each one of the patch antenna elements has a cylindrical projection shape of a rectangle curving about the pipe axis with a curvature thereof fitted to a curvature of the curved pipe wall inner surface about the pipe axis, with a longer dimension of the rectangle extending curved about the pipe axis and a shorter dimension of the rectangle extending parallel to the pipe axis. Each antenna arrangement respectively further comprises at least one dielectric substrate arranged between the pipe wall and at least one of the patch antenna elements. Each antenna arrangement respectively further comprises an energy coupling element that is electromagnetically coupled to at least the first patch antenna element so as to be adapted to couple the high frequency electromagnetic energy into or out of the respective antenna arrangement.

The invention has the advantage, that an integration in the hollow body arises due to the insertion or setting-in of patch element pairs into the inner pipe wall, whereby the inner cross-section of the through-flowable pipe remains unchanged. Thereby, simultaneously, the evolution of turbulences during the through-flowing of multi-phase powder-form or fluid media is prevented, of which the unhindered throughflow is often necessary for the following or subsequent processes. In that regard, especially the integration of two oppositely arranged bent or curved patch elements has been shown to be advantageous, because therewith a uniform spreading-out or propagation over the entire cross-section area with spreadable or propagable (propagatable) microwaves as electromagnetic waves is possible, through which the dielectric fluctuations due do multi-phase particle streams or flows are exactly detectable. With such an integrated antenna arrangement, however, also other longer high frequency transmissions are possible with a high efficiency in open pipe-shaped hollow conductors or waveguides, which are only slightly hampered by interference, especially due to an oriented in-coupling. Through the use of such integrated patch elements in the inner pipe wall, a microwave in-feeding supply or also an out-coupling can be carried out, for example through a coaxial conductor connector in a simple manner, through which relatively low losses arise, especially in connection with an oriented in-coupling.

In a particular embodiment of the invention it is provided that the in-feeding or supply of the microwave energy is provided off-center to the patch element width, which has the advantage that thereby an axially oriented wave spreading or propagation takes place in the pipe-shaped hollow body, whereby the efficiency in the propagation direction increases and simultaneously the interferences by a reflected wave propagation during the out-coupling are reduced. Thereby, not only can the measurement accuracy for a particle distribution or a mass flow determination be improved, but also thereby the transmission quality of the microwave propagation in open hollow conductor or waveguide structures can be increased. Namely particularly, also for pure transmission purposes, thereby an efficiency of far over 50% can be achieved between the in-coupling and out-coupling locations. Therefore, advantageously with relatively low in-coupling energies, relatively long microwave transmission sections or paths, or high measurement accuracies for prescribed measurement sections or paths, can be achieved.

Such antenna arrangements can advantageously also be used as capacitances, with which conveyed particle portions are electrostatically chargeable and are thus detectable at a different location for example for the throughflow speed determination.

BRIEF DESCRIPTION OF THE DRAWINGS

The invention will be explained more closely in connection with example embodiments, which are illustrated in the drawings. It is shown by.

DETAILED DESCRIPTION OF EXAMPLE EMBODIMENTS OF THE INVENTION

Figure 1:
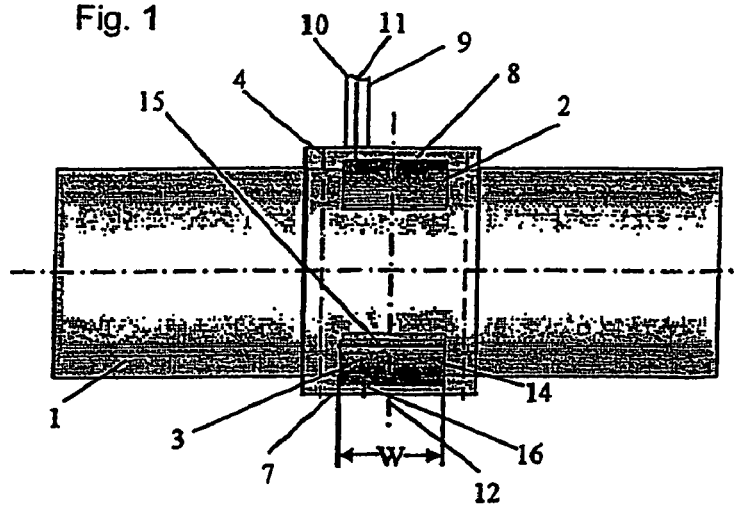
FIG. 1: a schematic side view of a round hollow conductor or waveguide with integrated antenna arrangement.

In FIG. 1 of the drawing, there is illustrated an antenna arrangement for high frequency in-feeding or out-coupling in a pipe-shaped hollow body 1 as a hollow conductor or waveguide, which antenna arrangement consists of so-called patch elements 2, 3, which are integrated in the inner wall 5 of the pipe-shaped hollow body 1.

The pipe-shaped hollow body 1 represents the cut-out section of a simple round pipe, as it is used for the pneumatic conveying of coal dust in the cement industry, that preferably consists of metal. However, the hollow body 1 can also represent a hollow conductor or waveguide that is not specified or suitable for conveying, as it is used, for example, for the transmission of high frequency waves in the microwave technology.

Figure 5:
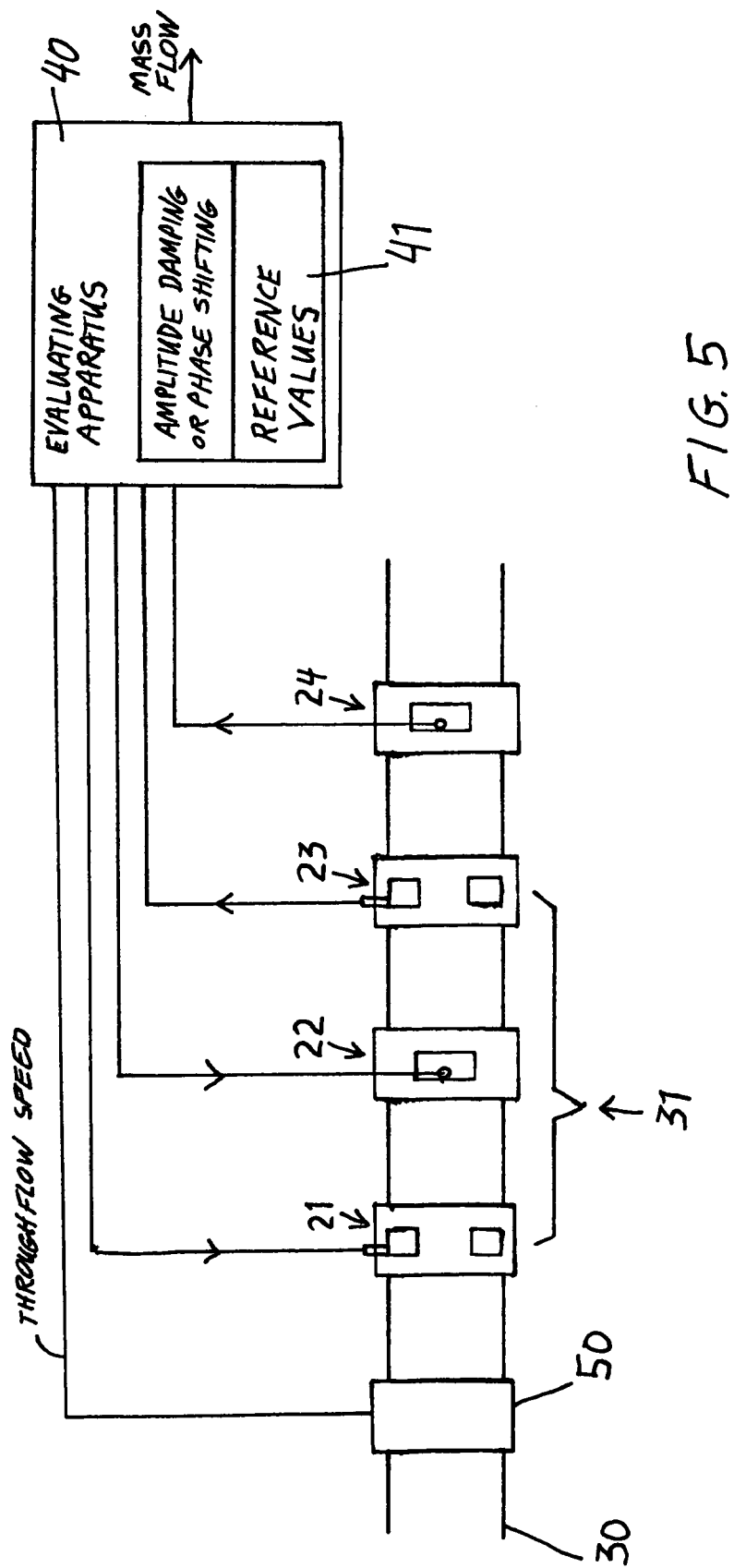
FIG. 5: a schematic side view of an apparatus for mass flow measurement including plural inventive antenna arrangements spaced axially from one another along a conveyor pipe to form a measuring pipe section.

In the present example embodiment it is provided, quantitatively to determine the coal dust particles flowing through the hollow body 1 embodied as a conveyor pipe, by means of two antenna arrangements (see FIG. 5). With such an antenna arrangement, however, also other particle or fluid flows or streams can be detected, which, in connection with their dielectric characteristics in the considered frequency range, influence the waves both in their magnitude as well as in their phase dependent on the density of the particle or fluid stream.

In order to be able to detect such a multi-phase particle stream of coal dust in the conveying medium air in the conveyor pipe 1 in a measurement technical manner by means of electromagnetic waves, preferably microwaves in the gigahertz range are utilized. For that purpose it is necessary to couple the microwaves into the conveyor pipe interior at least at one location, and to again couple the microwaves out at a different location, in order to evaluate an influence due to the through-flowing coal dust-air mixture relative to the in-coupling.

For that purpose, the invention proposes an antenna arrangement for the in-coupling or out-coupling of the microwave energy, which is embodied as a so-called patch antenna. In that regard, the antenna arrangement includes one or more patch element pairs 2, 3 that are arranged lying opposite one another in the pipe inner wall 5, and that consist of a rectangular-shaped electrically conductive metal part. The individual patch elements 2, 3 have a predeterminable length L and a width W that differs from the length L, and preferably consist of a substrate with a very well conducting layer, such as a thin copper metal sheet for example, which is applied in its longitudinal direction transversely or perpendicularly to the longitudinal direction of the conveyor pipe 1. In that regard, the patch element pair 2, 3 is not embodied planar as is typical, but rather conformingly fitted to the curved or bent surfaces of the pipe inner wall 5, and are inserted or set into a recess 20 in the pipe inner wall in a manner insulated from one another. The patch elements 2, 3 in that regard are integrated into the pipe inner wall 5 so that the radius of curvature thereof corresponds to or is equal to that of the inner wall radius.

Preferably, the antenna arrangement is embodied as a separate ring-shaped pipe member, that is insertable into an existing pipe system 1 as a small muff-type or sleeve-type intermediate piece 4. For that purpose, a separate metal ring is provided, of which the diameter is dimensioned so that the existing conveyor pipe ends can be clamped or screwed thereinto. The described example embodiment thereby begins from an intermediate piece 4 with an inner diameter of approximately 32 mm with which preferably microwaves with a frequency beginning from approximately 5.5 GHz can propagate in the base or fundamental mode ($TE_{11}$ mode). However, also larger or smaller pipe-shaped hollow bodies 1 or intermediate pieces 4 can be utilized, into which then correspondingly propagable microwaves with lower or higher frequencies are to be coupled-in.

Figure 2:
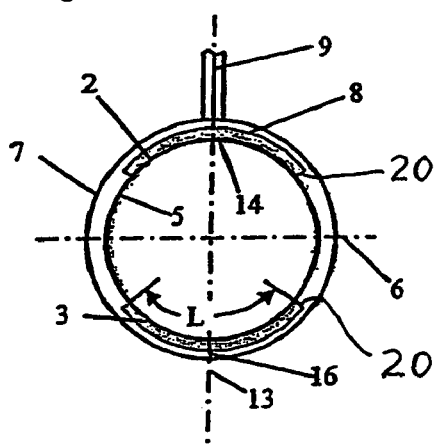
FIG. 2: a schematic front view onto the round waveguide with integrated antenna arrangement.

The cross-section of this antenna intermediate piece 4 as the pipe-shaped hollow body 1 is shown in detail in FIG. 2 of the drawing. As can be seen therefrom, the two oppositely lying patch elements 2, 3 are arranged, symmetrically to a center plane 6 extending in the pipe longitudinal direction, in a recess of the pipe inner wall 5, and thus form an antenna pair integrated into the conveyor pipe 1. The two patch elements 2, 3 are arranged electrically insulated by a dielectric substrate 8 relative to the outer conductive ring wall or pipe outer wall 7. In that regard, the first patch element 2 is provided from the outside with a coaxial connector 9 for the in-feeding of the microwave energy, whereby the outer conductor 10 of the coaxial connector 9 is electrically connected with the outer ring wall 7, and the inner conductor 11 of the coaxial connector 9 is electrically connected with the first patch element 2. The second patch element 3 of the antenna pair does not include any electrical connector and essentially serves for the radiation beam formation and the adjustment of the propagating direction of the microwaves. For improving the orienting or directing effect of the antenna arrangement, an additional microwave in-feed can also be carried out in the second patch element 3.

For improving the efficiency and reducing interferences, the in-feeding of the microwave energy in the first patch element 2 is preferably not introduced centrally in the crossing point of its two center lines 12, 13, but rather off-centered in the pipe longitudinal direction. Therefore, the inner conductor 11 is arranged on the longitudinal center line 13 of the patch element 2, which extends orthogonally to a longitudinal edge 14, but off-set to the transverse center line 12, which extends parallel to the longitudinal edge 14, whereby a directed or oriented radiation emission to one longitudinal direction of the conveyor pipe 1 arises. For that reason, an adapter element 16 lying opposite to the inner conductor 11 is provided preferably also in the second patch element 3, whereby the adapter element 16 connects the second patch element 3 with the pipe outer wall 7 in a manner that is electrically terminated for the high frequency waves. Nonetheless, the antenna arrangement according to the invention is also utilizable for the in-coupling and the out-coupling of the microwave energy also for a central in-feeding into the first patch element 2 and without adapter element 16.

The above described example embodiment produces a microwave in-feeding into a pipe-shaped hollow body according to the following physical method:

With an in-feeding of a microwave energy of preferably greater than or equal to 5.5 GHz as an electromagnetic high frequency wave through the coaxial connector 9, and a central in-feeding into the first rectangular patch element 2, an electrical field forms on the two longitudinal edges 14 thereof. Thereby the length L of the first patch element 2 is dimensioned so that a standing wave in the fundamental mode ($TE_{11}$ wave) can propagate in the conveyor pipe 1. The length L is calculated in a known manner from a multiple of the half wavelength $\lambda/2$ and an experimental fitting or adaptation due to the curved or bent surfaces, whereby preferably a length of approximately 30 mm arises for the first patch element 2. Because basically a radiation emission is possible on all four edges 14, 15 of patch elements, if these are in resonance due to their prescribed length, preferably only the half of the length L is selected for the width W of the patch elements 2, 3. Thereby spreading or propagating effects on the transverse edges 15 both in the fundamental mode as well as in the remaining propagation modes are largely avoided, so that essentially only one microwave radiation emission in the pipe longitudinal direction occurs for the first patch element 2. With a central in-feed, however, the radiation emission occurs uniformly in both longitudinal directions, so that maximally only 50% of the radiated microwave energy propagates in the desired direction in connection with a two-sided propagation with a prescribed measuring section or path in only one direction, and with a similar out-coupling maximally 25% of the radiated microwave energy can be coupled-out. This would be sufficient for measuring purposes, but would, nonetheless, lead to an increased evaluation effort or lead to the loss of the useful information if applicable, due to interfering reflections of the other propagation directions.

The oppositely lying second patch element 3 is provided for the uniform spreading or propagation of the electric field over the pipe cross-section, with the aid of which patch element, preferably for multi-phase particles flows, the distribution over the entire cross-section is exactly detectable, without further additional microwave in-couplings distributed about the circumference being necessary.

Figure 3:
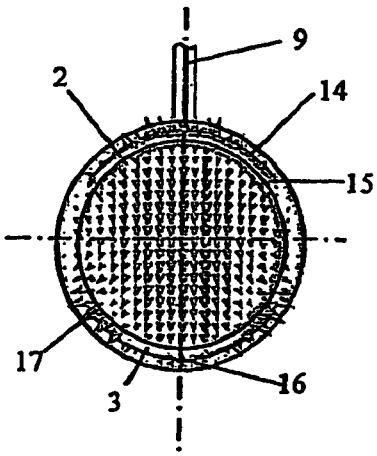
FIG. 3: a schematic field line pattern or progression of the base or fundamental wave ($TE_{11}$ mode) in the cross-section of the round waveguide at the in-coupling location.

A field line pattern or progression for a microwave in-coupling with off-center in-feeding, with reference to the pipe longitudinal direction, and with an adapter element 16 in the second patch element 3, is shown in FIG. 3 of the drawing. Thereby, the field line progression or pattern is schematically shown on the longitudinal edge 14, which illustrates an oriented radiation emission in one pipe longitudinal direction. Thereby the arrows 17 indicate the direction and magnitude of the electric field within the conveyor pipe 1. From the magnitude it can be recognized, that both patch elements 2, 3 are in resonance. Thereby, the field line pattern within the conveyor pipe 1 corresponds to that of a $TE_{11}$ wave, and thus a propagable wave within a round hollow conductor or waveguide. Due to the phase shifting of the microwaves exciting the patch elements, a directed radiation emission primarily in only one longitudinal direction of the conveyor pipe 1 is achieved, so that nearly the entire microwave energy is radiatable in the direction of the measuring section or path. Therefore, with a thusly directed radiation, the efficiency is increased to more than 90%, which leads to a ratio of the useful signal portion to the radiated-in microwave portion, of approximately 0.9. Since reflected microwaves hardly arise for such a directed radiation emission, the interference signal portion or component is also very small, so that time-pulsed synchronized in-coupling and out-coupling are unnecessary or dispensable.

Such a directed radiation emission is achieved in that a phase shifting arises between the two longitudinal edges 14 of the first patch element 2 due to the off-center in-coupling. This is brought about in that a maximum field strength is present on the longitudinal edge 14 in the radiation emission direction, while the field strength comprises a minimum on the oppositely lying longitudinal edge, and thereby preferably only a radiation emission in the measuring direction is achieved. A strengthening or amplification of this directing effect is simultaneously effectuated with the adapter element 16 at the second patch element 3. This adapter element 16 is preferably similarly offset or shifted off-center, and particularly exactly lying opposite the feed-in point of the inner conductor connection. In so far as this adapter element 16 does not lie in a field strength minimum, therefore there arises a change of the field distribution on the second patch, which leads to a phase shifting between the radiating longitudinal edges 14. With these two possibilities for the phase shifting between the two longitudinal edges, the spreading or propagation direction of the microwaves that are propagable within the hollow body can be adjusted or set as desired between 50% in both and more than 90% in one longitudinal direction.

With such an antenna arrangement integrated in the pipe inner wall 5 of a pipe-shaped hollow body 1, propagable electromagnetic high frequency waves can be both coupled-in as well as again coupled-out after a provided transmission section or path. Preferably, however, a plurality of these antenna arrangements e.g. 21, 22, 23 and 24 are provided axially spaced apart from one another along a conveyor pipe 30 as the pipe-shaped hollow body, to form a measuring pipe section 31 of an apparatus for mass flow measurement as schematically shown in FIG. 5, to serve for the measurement technical evaluation of the out-coupled relative to the in-coupled microwave energy and thereby to determine or measure a mass flow of a particulate material such as coal dust through the measuring section 31 of the conveyor pipe 30, by evaluating the microwave energy coupled-out by the antenna pair 23 relative to the microwave energy coupled-in by the antenna pair 21. Therefore, respectively at least one antenna pair 21 (and 22) for in-coupling and at least one further antenna pair 23 (and 24) for out-coupling of the microwave energy are provided in a prescribed pipe spacing distance of several wavelengths of preferably approximately one meter to form the respective measuring section 31. If now a through-flowing air and coal dust mixture is located in this pipe section as a measuring section 31 or path, then thereby the dielectric characteristics of the mixture change relative to a reference value in air or vacuum. Similarly, in connection with loading fluctuations, the coal dust particle portion or component will change over the measurement section or path per measuring cycle, which similarly leads to a change of the damping and a phase shifting with respect to the in-coupled microwave energy. In a comparison of the amplitude as well as the phase of the microwave signal with prescribed reference values 41, for example in connection with a hollow conductor or waveguide with only air flowing therethrough, as carried out in an evaluating apparatus 40, the proportion of the coal dust in the measuring section or path can be determined. Especially for the oriented or directed microwave in-coupling, a signal component that is still relatively large and substantially free of interferences can be coupled-out at the end of the measuring section 31, so that the damping of the microwave amplitude or the phase shifting is dependent nearly only on the coal dust proportion over the measuring section, so that exact measurement results are already achievable even with simple evaluating methods in the evaluating apparatus 40. For increasing the measurement accuracy, also several antenna pairs 21, 22, 23, 24 respectively for in-coupling (21, 22) and out-coupling (23, 24) can be provided in the pipe inner wall. These are preferably arranged offset relative to one another by 90° on the circumference of the pipe wall, so that the propagable microwaves do not influence one another in an interfering manner.

Additionally also the through-flow speed can be determined with the aid of the frequency shifting due to the Doppler effect or with the aid of the correlation of loading fluctuations, by means of a through low measuring apparatus 50. Simultaneously, with the corresponding electronic evaluating apparatus 40, the mass flow is also determinable quantitatively as a conveying magnitude or in the sum as a conveying quantity, from the coal dust particle proportion within the measuring section 31 multiplied by the conveying or through low speed. In practical experiments or tests, density measurement accuracies of 0.5% with a coal dust proportion of about 5% on average in air have been achieved with such an apparatus for the determination of the conveying magnitude.

Figure 4:
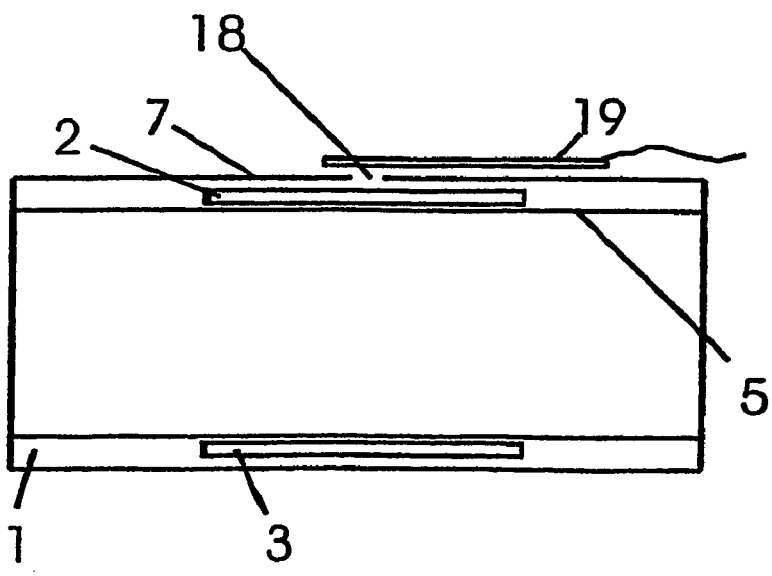
FIG. 4: a strip line conductor in-coupling on an antenna arrangement in a round waveguide.

A further example embodiment of the antenna arrangement is illustrated in FIG. 4 of the drawing. In this antenna arrangement, similarly an antenna pair of two oppositely lying rectangular flat patch elements 2, 3 is integrated in a pipe-shaped hollow body embodied as a conveyor pipe 1. Thereby, these are embodied similarly as already described for FIGS. 1 and 2, and are arranged in a recess electrically insulated from the electrically conductive pipe outer wall 7. The antenna arrangement differs from that illustrated in FIGS. 1 and 2 simply with respect to the type of the microwave in-coupling or out-coupling. For that, a coupling hole 18 or a coupling slot or slit for the so-called aperture coupling is provided in the electrically conductive part of the ring body or pipe body, centered or off-center relative to the first patch element 2 arranged thereunder.

Strip line conductors 19 for leading in the microwave energy are secured above the hole 18 or the slit. In that regard, also for the aperture coupling, preferably a frequency of the microwaves, in the example greater than or equal to 5.5 GHz, is necessary with a comparable pipe cross-section, in order to produce propagable microwaves in the inner space of the conveyor pipe 1. The propagatability of certain microwave frequencies in the pipe-shaped hollow body 1 is essentially dependent on the high pass characteristic of the hollow conductor or waveguide, according to which lower frequencies below the fundamental mode are not propagable. In that regard, the in-coupling of the microwaves in the fundamental mode $TE_{11}$ mode has the advantage that no lower frequencies, which could have an interfering effect for the phase measurement, are propagable.

Also with such an aperture coupling, a further antenna arrangement for the out-coupling can be provided at a prescribed axial spacing distance, whereby a measuring section or path for the determination of coal dust density, for example, arises. By means of a correlation measurement, additionally also the dust speed is determinable by means of a throughflow measuring apparatus, so that the mass flow or the conveying magnitude is calculable from the dust density and the volume of the measuring section and the product with the throughflow speed. However, with such an aperture coupling, the efficiency is considerably worse than with a coaxial connection coupling, due to the additional radiation emission outside of the pipe interior space, so that this type of the connection coupling is preferably only provided for cost or space reasons.

Such an antenna arrangement of the integrated patch element pairs 2, 3 can simultaneously also be utilized as a plate capacitor, because air or a different dielectric medium is located between the two patch elements 2, 3. If one now applies a high electrical voltage to the two patch elements 2, 3, then for example the through-flowing coal dust particles will be statically charged-up due to the electrical field built-up between the patch elements 2, 3. These electrical charges can again be detected in the conveying direction by further patch element pairs 2, 3 and can, for example, be evaluated for the speed measurement as a throughflow measuring apparatus and the like.

The invention claimed is:

1. Antenna arrangement for in-coupling or out-coupling of electromagnetic high frequency waves in a pipe-shaped hollow body (1),
   which comprises at least first and second patch elements that are each respectively embodied as a respective curved flat patch element (2, 3) applied on a dielectric substrate (8) within a pipe outer wall (7) of the hollow body (1), and
   which includes an energy supply element, which delivers high frequency energy through the pipe outer wall (7) to at least the first one of the patch elements (2),
   wherein the first and second patch elements are both together arranged and adapted to couple the electromagnetic high frequency waves either into the hollow body or out of the hollow body, and
   wherein the first and second patch elements are each respectively integrated into a pipe inner wall (5) of the hollow body (1) and have curved surfaces fitted to a curved longitudinal wall surface of the pipe inner wall of the hollow body (1), whereby the patch elements are embodied rectangularly and are each respectively arranged with a longitudinal side (14) thereof oriented transversely to the hollow body longitudinal direction, and wherein the second patch element (3) is located in the pipe inner wall (5) lying diametrically opposite to the first patch element (2).

2. Antenna arrangement according to claim 1, characterized in that the first patch element (2) and second patch element (3) form an antenna pair, which is arranged in a recess in the pipe inner wall of the pipe-shaped hollow body (1) with the dielectric substrate (8) between the respective patch elements and the pipe outer wall, whereby the antenna pair (2, 3) is electrically insulated relative to the pipe outer wall (7) which is metallic.

3. Antenna arrangement according to claim 2, characterized in that the antenna pair is arranged in such a manner in the recess of the pipe inner wall (5) of the hollow body (1), and is fitted in such a manner to round surfaces of the pipe inner wall (5), so that an interior cross-section of the hollow body remains unchanged by the antenna pair.

4. Antenna arrangement according to claim 2, characterized in that each one of the patch elements respectively consists of a curved partial cylindrical flat electrically conductive surface, of which longitudinal edges (14) are dimensioned so that a wave is propagable in its fundamental mode ($TE_{11}$ mode) or higher modes in the pipe-shaped hollow body (1), whereby a width (W) of the respective patch element (2, 3) is shorter than a length (L) thereof, and is dimensioned so that no waves can propagate on transverse edges (15) thereof but rather the patch elements serve for radiation beam formation.

5. Antenna arrangement according to claim 1, characterized in that the first and second patch elements (2, 3) are arranged symmetrically to a center plane (6), which extends in the longitudinal direction of the pipe-shaped hollow body (1).

6. Antenna arrangement according to claim 1, characterized in that at least one of the patch elements (2, 3) is electrically connected with the energy supply element, which comprises a coaxial (9), hollow, or strip line conductor connector (19), which feeds-in or couples-out the high frequency energy through the pipe outer wall (7).

7. Antenna arrangement according to claim 1, characterized in that the pipe-shaped hollow body (1) is embodied as a sleeve-shaped intermediate piece (4), into the pipe inner wall (5) of which the first and second patch elements (2, 3) are integrated, whereby the intermediate piece (4) is adapted to be built into a further-leading waveguide or a conveyor pipe with an inner cross-section the same as that of the intermediate piece with the patch elements integrated therein.

8. Antenna arrangement according to claim 1, characterized in that the high frequency energy can be coupled-in or coupled-out centrally in the first patch element (2) via an inner conductor (11) of a coaxial connector (9) or via a coupling hole (18) or coupling slit of a strip line conductor connector (19) of the antenna arrangement.

9. Antenna arrangement according to claim 1, characterized in that the high frequency energy can be coupled-in or coupled-out off-center relative to a transverse center line (12) of the first patch element (2) via an off-center coupling element comprising an inner conductor (11) of a coaxial connector (9) or a coupling hole (18) or coupling slit in the pipe outer wall (7) of a strip line conductor connector (19) of the antenna arrangement, whereby an off-center deviation from the transverse center line of the patch element is dimensioned so that in a propagable mode a directed wave propagation takes place substantially only in a longitudinal direction of the pipe-shaped body (1).

10. Antenna arrangement according to claim 9, characterized in that, lying opposite to the off-center coupling element of the first patch element (2), one or more off-center adapter elements (16) or further feed elements to the pipe outer wall (7) are provided off-center on the second patch element and are adapted to serve for the directed wave propagation in the pipe-shaped hollow body (1).

11. Apparatus for mass flow measurement with at least two of the antenna arrangements according to claim 1, characterized in that the two antenna arrangements are arranged axially spaced apart along a conveyor pipe section (1) serving as the pipe-shaped hollow body in common of both of the antenna arrangements, so as to form a measuring section, whereby propagable microwaves can be coupled into the pipe-shaped hollow body (1) by a first one of the antenna arrangements and can again be coupled-out at an end of the measuring section with a second one of the antenna arrangements, and the apparatus further comprising an evaluating apparatus by which the damping of the in-coupled microwave amplitudes and/or the phase shifting of the microwaves over the measuring section can be determined relative to provided reference values, which represent a value of the density of a particle stream in a conveying medium conveyed through the measuring section.

12. Apparatus for mass flow measurement according to claim 11, characterized in that the first and second patch elements of the first antenna arrangement are arranged offset by 90° about an axis of the conveyor pipe section relative to a further in-coupling antenna pair on the circumference of the pipe inner wall (5), which form a parallel measuring section with the first and second patch elements of the second antenna arrangement which are also offset by 90°.

13. Apparatus for mass flow measurement according to claim 11, further comprising a throughflow measuring apparatus by which a throughflow speed of the particle stream can be determined, and wherein the evaluating apparatus is adapted to calculate a mass flow as a conveying magnitude and/or a conveying quantity from the throughflow speed in connection with a throughflow density within the measuring section.

14. Antenna arrangement according to claim 1, adapted for in-coupling or out-coupling microwaves as said high frequency waves.

15. An apparatus comprising a hollow pipe-shaped body and at least one antenna arrangement that is respectively arranged and adapted to couple high frequency electromagnetic energy into or out of a hollow pipe interior of said pipe-shaped body, wherein:

said pipe-shaped body comprises a pipe wall that extends longitudinally along a pipe axis, and that is radially outwardly bounded by a pipe wall outer surface, and that is radially inwardly bounded by a curved pipe wall inner surface;

said curved pipe wall inner surface curves around said pipe axis and circumferentially surrounds said hollow pipe interior of said pipe-shaped body;

each said antenna arrangement respectively comprises first and second patch antenna elements that are both together arranged and adapted to couple the high frequency electromagnetic energy either into said hollow pipe interior or out of said hollow pipe interior;

said first and second patch antenna elements of said respective antenna arrangement are arranged diametrically opposite one another in said pipe wall, with each one of said patch antenna elements received radially between said pipe wall inner surface and said pipe wall outer surface;

each one of said patch antenna elements has a cylindrical projection shape of a rectangle curving about said pipe axis with a curvature thereof fitted to a curvature of said curved pipe wall inner surface about said pipe axis, with a longer dimension of said rectangle extending curved about said pipe axis and a shorter dimension of said rectangle extending parallel to said pipe axis;

each said antenna arrangement respectively further comprises at least one dielectric substrate arranged between said pipe wall and at least one of said patch antenna elements; and each said antenna arrangement respectively further comprises an energy coupling element that is electromagnetically coupled to at least said first patch antenna element so as to be adapted to couple said high frequency electromagnetic energy into or out of said respective antenna arrangement.

16. The apparatus according to claim 15, wherein said pipe wall has at least one recess in said pipe wall inner surface, and wherein said first and second patch antenna elements and said at least one dielectric substrate are received in said at least one recess in said pipe wall inner surface.

17. The apparatus according to claim 16, wherein said patch antenna elements respectively have radially inner curved surfaces matching said curvature of said curved pipe wall inner surface, and said patch antenna elements are arranged with said radially inner curved surfaces thereof continuing a surface contour of said curved pipe wall inner surface at said at least one recess so that an interior cross-section of said hollow pipe interior is maintained unchanged by said patch antenna elements.

18. The apparatus according to claim 15, wherein said energy coupling element is electromagnetically coupled to said first patch antenna element at a location that is centered with respect to said shorter dimension of said first patch antenna element extending parallel to said pipe axis.

19. The apparatus according to claim 15, wherein said energy coupling element is electromagnetically coupled to said first patch antenna element at a location that is off-centered with respect to said shorter dimension of said first patch antenna element extending parallel to said pipe axis.

20. The apparatus according to claim 15, wherein said energy coupling element is electromagnetically coupled only to said first patch antenna element, and there is no energy coupling element connected to said second patch antenna element which is adapted to serve as a passive element for radiation beam formation and wave propagation direction in conjunction with said first patch antenna element.

21. The apparatus according to claim 15, wherein said energy coupling element is electromagnetically coupled to both said first patch antenna element and said second patch antenna element.

22. The apparatus according to claim 21, wherein said energy coupling element comprises a coaxial cable having an inner conductor connected to said first patch antenna element and an outer conductor connected to said pipe wall, and wherein said second patch antenna element is electrically conductively connected to said pipe wall.

23. The apparatus according to claim 15, wherein said energy coupling element is a first energy coupling element that is electromagnetically coupled to said first patch antenna element, said apparatus further comprises a second energy coupling element that is electromagnetically coupled to said second patch antenna element, and said first and second energy coupling elements are both together adapted and arranged either to feed said electromagnetic energy to said patch antenna elements or to extract said electromagnetic energy from said patch antenna elements.

24. The apparatus according to claim 15, for measuring a mass flow of material through said hollow pipe-shaped body, wherein said at least one antenna arrangement includes a first said antenna arrangement and a second said antenna arrangement axially spaced apart from one another along said pipe axis of said pipe wall of said pipe-shaped body thereby defining a measuring section of said pipe-shaped body axially between said first and second antenna arrangements, wherein said first antenna arrangement is arranged and adapted to couple the electromagnetic energy into said hollow pipe interior of said pipe-shaped hollow body at a beginning of said measuring section and said second antenna arrangement is arranged and adapted to couple the electromagnetic energy out of said hollow pipe interior of said pipe-shaped hollow body at an end of said measuring section, and wherein said apparatus further comprises an evaluating device connected to said second antenna arrangement and adapted to evaluate an amplitude damping and/or a phase-shifting of said electromagnetic energy coupled out of said hollow pipe interior by said second antenna arrangement relative to said electromagnetic energy coupled into said hollow pipe interior by said first antenna arrangement and adapted to compare said amplitude damping and/or said phase-shifting with reference values to determine the mass flow of the material through the measuring section of the pipe-shaped body.

\* \* \* \* \*